(12) United States Patent
Marro et al.

(10) Patent No.: US 9,090,154 B2
(45) Date of Patent: Jul. 28, 2015

(54) MOTORIZED HUB COMPRISING AN ELECTRIC TRACTION UNIT

(75) Inventors: Patrick Marro, Clermont-Ferrand Cedex (CH); Daniel Walser, Clermont-Ferrand Cedex (CH)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 227 days.

(21) Appl. No.: 13/807,953

(22) PCT Filed: Jun. 30, 2011

(86) PCT No.: PCT/EP2011/061062
§ 371 (c)(1),
(2), (4) Date: Mar. 21, 2013

(87) PCT Pub. No.: WO2012/001128
PCT Pub. Date: Jan. 5, 2012

(65) Prior Publication Data
US 2013/0207446 A1  Aug. 15, 2013

(30) Foreign Application Priority Data
Jul. 1, 2010  (FR) ..................................... 10 55271

(51) Int. Cl.
*B60K 7/00* (2006.01)
*B60K 17/04* (2006.01)
*B60T 13/74* (2006.01)
(Continued)

(52) U.S. Cl.
CPC ............. *B60K 7/0007* (2013.01); *B60K 17/043* (2013.01); *B60T 13/741* (2013.01); *B60T 13/746* (2013.01); *F16D 55/227* (2013.01); *H02K 7/102* (2013.01); *H02K 7/116* (2013.01);
(Continued)

(58) Field of Classification Search
USPC ............. 180/65.1, 65.51, 65.6; 310/66, 67 R, 310/75 R, 77
See application file for complete search history.

(56) References Cited

U.S. PATENT DOCUMENTS 4,799,564 A * 1/1989 Iijima et al. ................. 180/65.51
4,913,258 A * 4/1990 Sakurai et al. ................. 180/242
(Continued)

FOREIGN PATENT DOCUMENTS

FR       2 859 951       3/2005
JP     2005 263140       9/2005
(Continued)

*Primary Examiner* — J. Allen Shriver, II
*Assistant Examiner* — Bridget Avery
(74) *Attorney, Agent, or Firm* — Cozen O'Connor

(57) ABSTRACT

Motorized hub for an electrically powered motor vehicle comprising a wheel hub mounted to rotate about a hub axis, and an electric traction unit comprising an external stator connected to a hub carrier and an internal rotor (31) whose axis of rotation is distant from the hub axis. The motorized hub comprises reduction means acting between shaft (33) of rotor (31), friction braking means, and a braking rotor secured to the hub. The reduction means comprise a drive pinion connected to the rotor (31) and a ring gear connected to the hub. A brake shaft passes through the hub carrier to connect the braking rotor to the hub. The reduction means comprise two reduction stages and the hub is mounted so that it can rotate via rolling-contact hub bearings positioned around a stub axle of the hub carrier, the brake shaft passing axially through a cavity of the stub axle.

12 Claims, 2 Drawing Sheets

(51) Int. Cl.
 *F16D 55/227* (2006.01)
 *H02K 21/22* (2006.01)
 *H02K 7/102* (2006.01)
 *H02K 7/116* (2006.01)

(52) U.S. Cl.
 CPC ..... *H02K 21/222* (2013.01); *B60K 2007/0038* (2013.01); *B60K 2007/0061* (2013.01)

(56) References Cited

U.S. PATENT DOCUMENTS

| | | | |
|---|---|---|---|
| 6,257,604 B1 * | 7/2001 | Laurent et al. | 280/124.127 |
| 7,537,071 B2 * | 5/2009 | Kamiya | 180/65.51 |
| 7,770,677 B2 * | 8/2010 | Takenaka | 180/65.51 |
| 7,828,095 B2 * | 11/2010 | Murata et al. | 180/65.51 |
| 7,950,483 B2 * | 5/2011 | Murata | 180/65.51 |
| 8,037,957 B2 * | 10/2011 | Laurent | 180/65.51 |
| 8,490,729 B2 * | 7/2013 | Walser et al. | 180/65.51 |
| 8,596,395 B2 * | 12/2013 | Hirano | 180/65.51 |

FOREIGN PATENT DOCUMENTS

| | | |
|---|---|---|
| JP | 2007 120559 | 5/2007 |
| WO | WO 2007/017221 | 2/2007 |
| WO | WO 2009/124892 | 10/2009 |

* cited by examiner

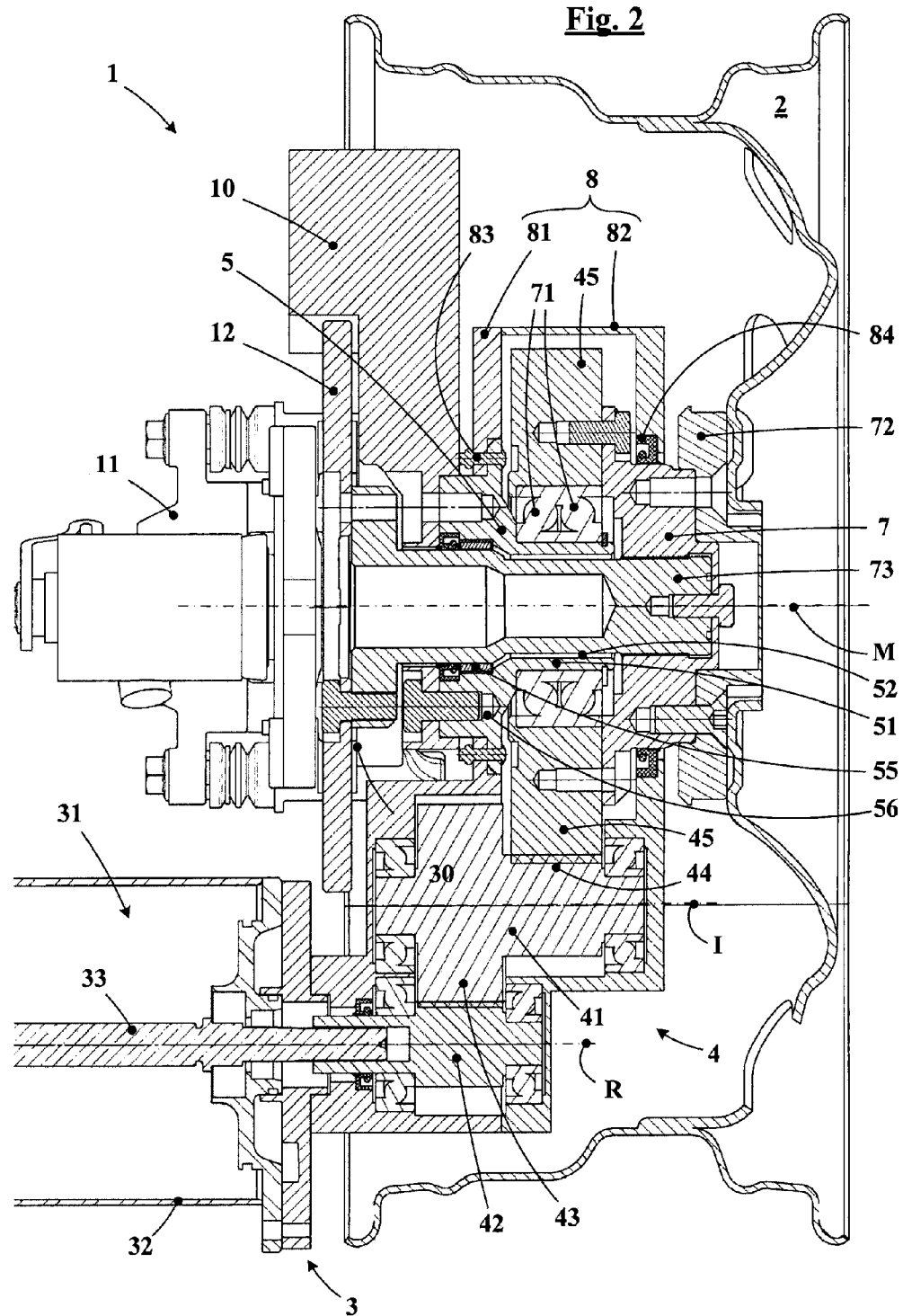

MOTORIZED HUB COMPRISING AN ELECTRIC TRACTION UNIT

RELATED APPLICATIONS

This is a U.S. National Phase Application under 35 USC 371 of International Application PCT/EP2011/061062 filed on Jun. 30, 2011.

This application claims the priority of French application no. 10/55271 filed Jul. 1, 2010, the entire content of which is hereby incorporated by reference.

FIELD OF THE INVENTION

The present invention relates to the ground contact system of electrically powered motor vehicles, particularly to the motorized wheels thereof.

BACKGROUND OF THE INVENTION

A certain number of proposals such as those in documents EP 0878332, EP 1630026, WO 2006/032669, US 2007/0257570, WO 2007/083209 or WO 2009/124892 are known in this field.

In the present application, the expression "motorized hub" is used to denote the mechanical assembly comprising the hub, the hub carrier, the guidance of the hub with respect to the hub carrier, the electric drive and the hub braking means. The motorized hub is therefore intended on the one hand to accept a wheel fitted for example with a pneumatic tyre and, on the other hand, to support a vehicle, generally via suspension means. In the present application, the expression "motorized wheel" is likewise used to denote the mechanical assembly comprising the motorized hub defined hereinabove plus the corresponding wheel.

Document WO 2009/124892 describes such motorized hubs the design of which exhibits good compatibility with the solutions already adopted and validated by motor manufacturers for certain elements such as the suspension systems and the wheels. For this purpose, it is proposed that the shaft of the electric unit be positioned radially on the outside of the brake disc, the brake disc being positioned on the inboard side of the vehicle with respect to the hub carrier. According to a first alternative form depicted in FIGS. 1 and 2 of document WO 2009/124892, the hub rotates in a bore of the casing. The casing therefore acts as a hub carrier and also supports the brake caliper. The guidance rigidity of such a design proves to be insufficient. According to another alternative form depicted in FIG. 3 of that same document WO 2009/124892, the hub rotates about a stub axle, the said stub axle crossing the plane of the brake disc. The rigidity of this guidance also proves to be insufficient because of the great length of the stub axle. According to yet other alternative forms depicted in FIGS. 4 to 8 of that same document, the hub rotates in a bore of the casing but the brake caliper is this time held by the suspension arm rather than by the casing. These latter alternative forms, although satisfactory from a guidance standpoint, are very complicated to assemble and are therefore very expensive both from a manufacturing and from a maintenance standpoint.

SUMMARY OF THE INVENTION

It is therefore an object of the present invention to improve motorized hubs of this type to make them perform even better, for example by making them more rigid and/or more compact and/or more lightweight.

One aspect of the invention relates to a motorized hub for an electrically powered motor vehicle, the said motorized hub comprising a hub intended to accept a wheel, the hub being mounted so that it can rotate with respect to a hub carrier about a hub axis, the motorized hub comprising an electric traction unit, the electric unit comprising an external stator connected to the hub carrier, and an internal rotor the axis of rotation of which is distant from the hub axis, the motorized hub comprising reduction means acting between the shaft of the rotor of the electric unit and the hub, the motorized hub comprising dry-friction braking means, a braking rotor cooled by the ambient air being secured to the hub in terms of rotation via a brake shaft, the brake rotor being positioned axially on the inboard side of the vehicle with respect to the said hub, the shaft of the rotor of the electric unit being positioned radially on the outside of the braking rotor and extending axially from the reduction means towards the inside of the vehicle, the reduction means comprising a drive pinion connected to the rotor of the electric unit and a ring gear connected to the hub, a brake shaft passing through the hub carrier to connect the braking rotor to the hub, the brake shaft being independent of the reduction means, the motorized hub being characterized in that the reduction means comprise two reduction stages and in that the hub is mounted so that it can rotate via rolling-contact hub bearings positioned around a stub axle of the hub carrier, the brake shaft passing axially through a cavity of the stub axle.

For preference, a first reduction stage provides for meshing of the drive pinion with a gear wheel secured to an intermediate shaft, a second reduction stage provides for meshing of a reduction pinion secured to the intermediate shaft with the ring gear connected to the hub.

For preference, the axis of the intermediate shaft and the axis of the rotor are parallel to the axis of the hub.

For preference, the braking rotor is a disc, a brake caliper being secured to the hub carrier.

For preference, the brake shaft passing through the stub axle is also guided with respect to the hub carrier by a bearing.

For preference, a casing contains the reduction means and supports the electric unit.

For preference, the braking rotor extends radially out of the radially innermost part of the stator of the electric unit, the braking rotor being positioned axially between the stator of the electric unit and the reduction means.

Another aspect of the invention relates to a motorized wheel comprising such a motorized hub.

For preference, the motorized wheel comprises a one-piece conventional wheel, more preferably still made of steel sheet.

Another aspect of invention relates to a vehicle comprising at least two such motorized wheels.

For preference, two motorized wheels are arranged on the rear axle of the said vehicle. Again for preference, the hub carriers of the two motorized wheels are each secured to an arm of a rear torsion axle or rear trailing arm axle of the said vehicle.

BRIEF DESCRIPTION OF THE DRAWINGS

Further features and advantages of the invention will become apparent from the description of a preferred embodiment. The figures respectively depict:

FIG. 2: view of this embodiment in cross section along the broken line A-A visible in FIG. 1.

Figure 1:
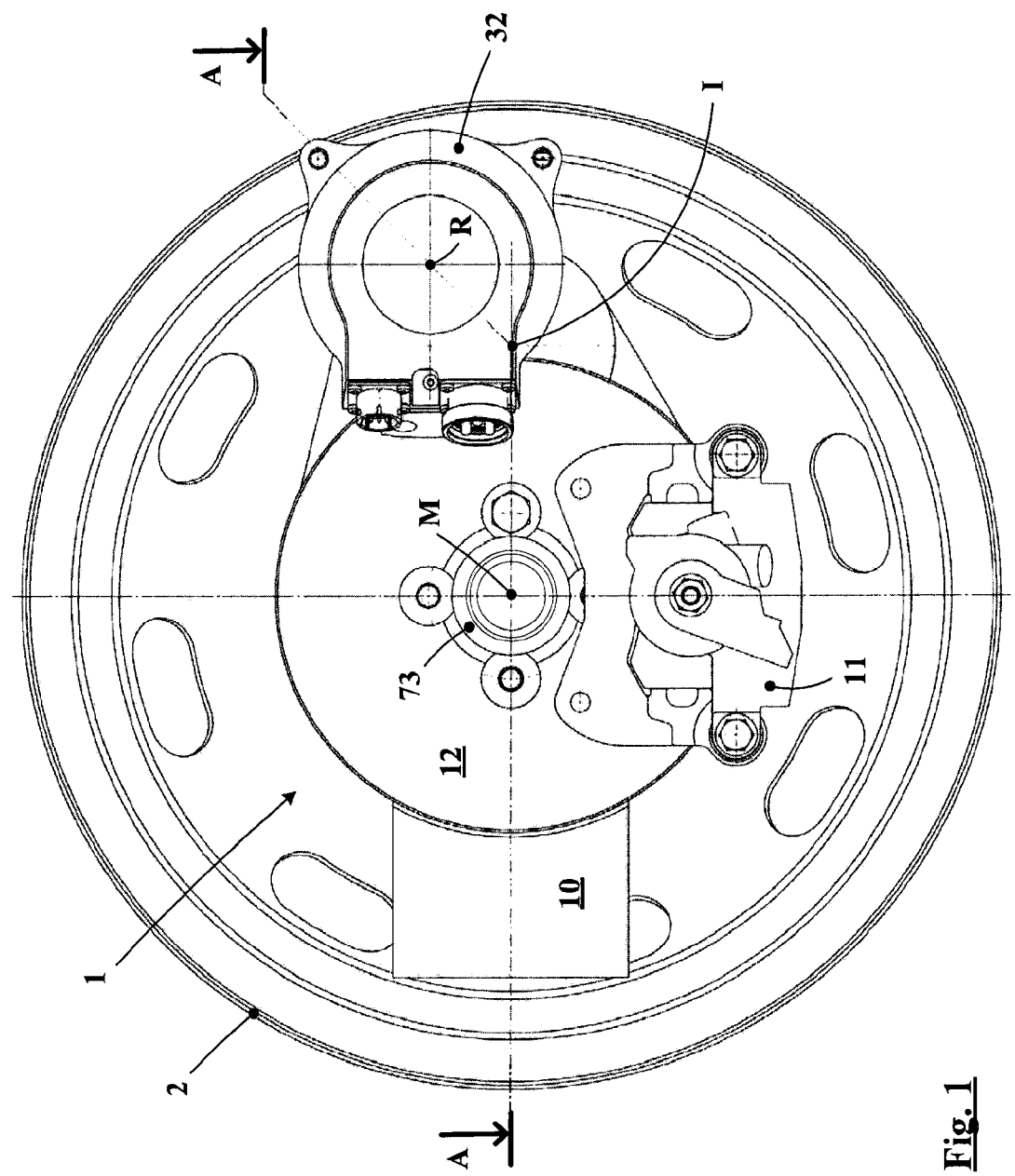
FIG. 1: plan view of one embodiment of the motorized hub according to the invention, from the inboard side of the vehicle along the hub axis.

In the various figures, elements that are identical or similar bear the same reference. They are therefore not systematically redescribed.

DETAILED DESCRIPTION OF THE DRAWINGS

The figures depict a preferred embodiment of a motorized wheel according to the invention. The motorized hub 1 is intended to guide and control the rotation of a wheel 2. The pneumatic tyre has been omitted from the figures. A hub 7, intended to accept the wheel 2, is mounted so that it can rotate with respect to a hub carrier 5 about a hub axis M.

The hub axis M is a constant reference in the present application and it is with respect to this axis that reference is made in order to qualify an orientation as either "radial" or "axial". Remember, and according to the usage employed in the field of wheels or tyres, an axial orientation is an orientation parallel to the axis of the hub and a radial orientation is an orientation perpendicular to the axis of the hub.

An electric unit 3 drives and, where appropriate brakes, the hub. To simplify the drawing of the electric unit, only the shaft 33 of the internal rotor 31 and the sleeve of the external stator 32 have been depicted. The rotation of the electric unit is coupled to the rotation of the hub via reduction means 4.

One essential feature of the motorized hub according to the invention is that the reduction means 4 comprise at least two reduction stages. For preference, as depicted here, the reduction means consist of two reduction stages. The first reduction stage consists of the meshing of the drive pinion 42 and of a gear wheel 43 connected to an intermediate shaft 41. The drive pinion 42 is driven via the shaft 33 of the rotor of the electric unit 3. The second reduction stage consists of the meshing of a reduction pinion 44 connected to the intermediate shaft 41 with a hub ring gear 45 secured to the hub 7.

The axis of the rotor R is distant from the hub axis M. The axis I of the intermediate shaft 41 is preferably, as depicted here, parallel to the hub axis M and to the axis of rotation R of the rotor. The overall reduction ratio is preferably higher than 15.

Another essential feature of the motorized hub according to the invention is that the hub carrier 5 comprises a stub axle 51 about which the hub turns, guided by rolling-contact hub bearings 71. The inner part of the rolling-contact hub bearings is therefore fixed because secured to the hub axle 51, whereas the outer part of the rolling-contact bearings rotates with the hub 7. In this preferred embodiment, guidance is afforded by a double row ball bearing positioned more or less facing the ring gear 45 secured to the hub.

Another essential feature of the motorized hub according to the invention is that the braking rotor, which in this instance means the disc 12, is situated on the inboard side of the vehicle with respect to the hub carrier. A brake shaft 73 secured to the hub 7 directly drives the rotation of the disc. The hub and the disc are therefore at all times driven at the same rotational speed irrespective of the transmission between the electric unit and the hub, which means to say irrespective of the reduction means. The brake shaft works in parallel with the reduction means and therefore does not form part of the transmission. To achieve this, the brake shaft runs axially through the hub carrier, which means to say that it rotates in a cavity 52 of the stub axle 51. The stub axle is therefore hollow.

Achieving independence between the transmission and the braking means is important from an operational safety standpoint.

For preference, the brake shaft is also guided by a bearing 55 in the stub axle. For preference, this bearing is a needle bearing. The brake shaft is hollow here also, in order to limit its weight.

The reduction and guidance means assembly is housed in a casing 8. The casing may also contain a suitable quantity of lubricant for lubricating it all by splash lubrication. The interior part 81 of the casing here is not made as one with the hub carrier 5 but these two components are assembled using bolts 83. One advantage of this separation is that different materials can then be chosen for the hub carrier and for the casing, for example steel and an aluminium alloy respectively. The outer part 82 of the casing has a central opening for the hub 7. A lip seal 84 provides sealing around the hub. It will be appreciated that a sealed rolling-contact bearing could be fitted instead of the seal 84 in order further to enhance the guidance of the wheel and the reduction means. The casing is particularly compact and rigid because of the small-diameter ring gear.

The stator 32 of the electric unit is connected in terms of rotation to the hub carrier 5. This connection, which is necessary for transmitting torque, may be rigid and direct as depicted here but may equally be indirect in order to allow a relative rotational movement to cope with suspension travel. This relative movement must of course be limited and is intended to allow a certain degree of independence between the transmitted torque and the dynamic rigidities (vertical and horizontal) of the suspension device. In this instance, the stator 32 is therefore secured to the casing 8 while the casing is itself secured to the hub carrier 5. Assuming that casing rotation with respect to the hub carrier is permitted, this rotation can be controlled for example by a link rod acting between the casing and the body shell of the vehicle (not depicted).

The motorized hub according to the invention may be fixed to the vehicle, more specifically to its suspension system, by means of bolts fitted into screw threads 56 of the hub carrier 5. The casing 8 is then fixed to the base of the stub axle and then supports only the electric unit and the reduction means.

As schematically indicated in the figures, the motorized hub according to the invention may be fixed to a trailing arm 10 of an axle of a vehicle, for example a rear torsional axle or trailing arm axle. The front of the vehicle is then to the left in FIG. 1. It will be readily understood that the motorized hub according to the invention may also be combined with other types of front or rear suspension system, such as semi-trailing arm systems, multilink systems, or MacPherson strut or pseudo-MacPherson strut systems.

The brake caliper 11 is of course secured to the hub carrier 5, for example via the suspension arm 10.

The vehicle according to the invention may be a purely electrically powered vehicle or a hybrid vehicle. One advantageous way of constructing a hybrid vehicle is to combine conventional combustion engine power for the front axle with electric drive to the wheels of the rear axle using motorized hubs according to the invention. The source of electrical power may be a bank of batteries or supercapacitors, a fuel cell, an urban network in the manner of trolley buses, or any other available electrical power source.

The figures depict just one electric unit. Naturally, it is possible according to the invention to use two or more units for each hub, the units each meshing via their own drive pinion with dedicated or shared reduction means. With multiple drive units, it is possible to increase the torque available and/or to reduce the axial and radial dimensions of the electric units.

Likewise, it is a disc brake that has been systematically depicted. This is because this is the preferred embodiment although the person skilled in the art knows that in certain situations it may be preferable to use a drum brake instead of the disc brake.

However the invention is embodied, the reduction means are preferably reversible so as to allow the electric unit to be used in braking mode. The electrical energy recuperated by the electric unit during braking mode can be stored or dissipated in the way known per se.

One advantage of the present invention is that use can be made of wheels and brakes (air-cooled ventilated or unventilated single-disc dry brakes and calipers) which are entirely conventional and therefore relatively economical to purchase and to maintain.

A flange 72 is fixed at the outer end of the hub 7 and accepts the wheel 2 attached by bolts which have not been depicted. Naturally, a different wheel could be fixed directly to the hub 7 without recourse to the flange, but the system depicted here has the advantage of accommodating entirely conventional wheels and wheel bolts. The wheel depicted here is a standard one-piece wheel made of sheet steel.

For preference, as depicted in the figures, all of the reduction means is contained in the wheel. In this instance, the whole of the stator of the electric unit is positioned axially outside the wheel toward the inboard side of the vehicle. Depending on the dimensions of the wheel in particular, a greater or lesser proportion of the electric unit can be included inside the wheel.

For preference, the rotation of the electric unit is permanently coupled to the rotation of the hub as depicted here.

Although the present description concentrates on one specific embodiment, the person skilled in the art knows how to conceive of other combinations of different means described here with other means not described here but known from the prior art.

The invention claimed is:

1. A motorized hub for an electrically powered motor vehicle, the motorized hub comprising:
    a hub configured to accept a wheel, the hub being mounted to rotate with respect to a hub carrier about a hub axis;
    an electric traction unit, the electric traction unit comprising an external stator connected to the hub carrier, and an internal rotor, wherein an axis of rotation of the internal rotor is distant from the hub axis;
    a reduction device acting between a shaft of the rotor of an electric unit and the hub
    a dry-friction brake; and
    a braking rotor configured to be cooled by ambient air being and secured to the hub in terms of rotation via a brake shaft, the braking rotor being positioned axially on an inboard side of the vehicle with respect to the hub, the shaft of the rotor of the electric traction unit being positioned radially on the outside of the braking rotor and extending axially from the reduction device towards inside the vehicle,
    wherein the reduction device comprises a drive pinion connected to the rotor of an electric unit and a ring gear connected to the hub, the brake shaft passing through the hub carrier to connect the braking rotor to the hub, the brake shaft being independent of the reduction device,
    wherein the reduction device comprises two reduction stages, and
    wherein the hub is mounted so that it can rotate via rolling-contact hub bearings positioned around a stub axle of the hub carrier, the brake shaft passing axially through a cavity of the stub axle.

2. The motorized hub according to claim 1, wherein:
    a first reduction stage comprises meshing of the drive pinion with a gear wheel secured to an intermediate shaft, and
    a second reduction stage comprises meshing of a reduction pinion secured to the intermediate shaft with the ring gear connected to the hub.

3. The motorized hub according to claim 1, wherein:
    the braking rotor is a disc, and
    a brake caliper is secured to the hub carrier.

4. The motorized hub according to claim 1, wherein the brake shaft passing through the stub axle is also guided with respect to the hub carrier by a bearing.

5. The motorized hub according to claim 1, wherein a casing contains the reduction device and is configured to support the electric unit.

6. The motorized hub according to claim 1, wherein:
    the braking rotor extends radially out of the radially innermost part of the stator of the electric unit, and
    the braking rotor is positioned axially between the stator of the electric unit and the reduction device.

7. A motorized wheel comprising the motorized hub according to claim 1.

8. The motorized hub according to claim 2, wherein the axis of the intermediate shaft and the axis of the rotor are parallel to the axis of the hub.

9. The motorized wheel according to claim 7, further comprising a one-piece wheel.

10. A vehicle comprising at least two motorized wheels according to claim 7.

11. A vehicle according to claim 10, wherein two motorized wheels are arranged on a rear axle of the vehicle.

12. The vehicle according to claim 11, wherein the hub carriers of the two motorized wheels are each secured to an arm of a rear torsion axle or trailing arm axle of the vehicle.

* * * * *